US011458898B2

(12) United States Patent
Ishibashi

(10) Patent No.: US 11,458,898 B2
(45) Date of Patent: Oct. 4, 2022

(54) OVERHEAD CONSOLE

(71) Applicant: Yazaki Corporation, Tokyo (JP)

(72) Inventor: Shuichi Ishibashi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 34 days.

(21) Appl. No.: 17/326,635

(22) Filed: May 21, 2021

(65) Prior Publication Data

US 2021/0394679 A1 Dec. 23, 2021

(30) Foreign Application Priority Data

Jun. 17, 2020 (JP) ............................ JP2020-104269

(51) Int. Cl.
*B60R 1/12* (2006.01)
*B60R 1/00* (2022.01)

(52) U.S. Cl.
CPC ............ *B60R 1/1207* (2013.01); *B60R 1/008* (2013.01); *B60R 2001/1215* (2013.01); *B60R 2001/1238* (2013.01)

(58) Field of Classification Search
CPC .................. B60R 1/1207; B60R 1/008; B60R 2001/1215; B60R 2001/1238; B60R 2011/0028; B60R 2022/4866; B60R 22/48; B60R 1/12; B60K 37/06; B60Q 3/208; B60Q 3/74; B60Q 3/80; B60Q 3/82

See application file for complete search history.

(56) References Cited

U.S. PATENT DOCUMENTS

2003/0117728 A1* 6/2003 Hutzel ...................... B60R 1/12 359/850
2005/0134073 A1* 6/2005 Tokutomi .................. B60R 7/04 296/37.8
2008/0252090 A1* 10/2008 Tiesler .................... B60R 1/008 296/37.7

FOREIGN PATENT DOCUMENTS

JP 11-208377 A 8/1999
JP 2011-105157 A 6/2011

* cited by examiner

*Primary Examiner* — Sath V Perungavoor
*Assistant Examiner* — Tyler B Edwards
(74) *Attorney, Agent, or Firm* — Sughrue Mion, PLLC

(57) ABSTRACT

An overhead console includes a console housing, an illumination board, a vehicle interior checking mirror, a mirror surface light source mounted on the illumination board together with the illumination light source and configured to emit light toward the mirror surface of the vehicle interior checking mirror in the mirror surface visible position, and a see-through display plate that is a display plate capable of transparently displaying a symbol indicating predetermined information, the see-through display plate being provided in the console housing at a location between the mirror surface light source and the mirror surface so as not to hinder the passenger from visually recognizing the mirror surface and so as to face a partial region of the mirror surface, and the see-through display plate being configured to allow light from the mirror surface light source to transmit therethrough to display the symbol on the partial region of the mirror surface.

6 Claims, 7 Drawing Sheets

G10
141a
10
11
111
14,14a
141

OVERHEAD CONSOLE

TECHNICAL FIELD

The present invention relates to an overhead console to be mounted on a ceiling of a vehicle interior at a location near a windshield.

BACKGROUND

Conventionally, an overhead console that is mounted on a ceiling of a vehicle interior at a location near a windshield is known (for example, refer to Patent Document 1). In addition to an illumination light source, various operation switches and such are mounted to the overhead console.

It is known to display a symbol indicating a seatbelt fastening state to warn a passenger in the vehicle who is not fastening his/her seatbelt, in which a display function for displaying the symbol is provided to the overhead console (for example, refer to Patent Document 2). By providing the display function as mentioned above to the overhead console, the displayed symbol can be easily seen by all passengers in the vehicle interior.

PRIOR ART DOCUMENTS

Patent Document 1: JP H11-208377 A
Patent Document 2: JP 2011-105157 A

SUMMARY OF THE INVENTION

Problem to be Solved by the Invention

The overhead console described in Patent Document 2 has a problem that, when a display unit for displaying the symbol is placed too close to the illumination light source to downsize the overhead console, it could be difficult to see the symbol when the illumination light source is turned on simultaneously with the display of the symbol due to the illumination being too bright. It is thus desirable to place the display unit at a location some distance from the illumination light source. This, however, requires to provide a circuit board for the display unit separately for a mounting board for the illumination light source, making it difficult to downsize the overhead console.

In the above explanation, the symbol indicating the seatbelt fastening state was given as one example of a symbol to be displayed by the display function provided on the overhead console, and the problem that there is difficulty in downsizing the overhead console has been explained. This problem, however, could occur in providing the display function in the overhead console regardless of a specific symbol to be displayed by the display function.

In view of this, an object of the present invention is to provide an overhead console that includes a display function and that can be downsized.

Solution to the Problem

In order to achieve the above-described object, the present invention provides, in one aspect, an overhead console including a console housing attached to a ceiling of a vehicle interior at a location near a windshield, an illumination board on which an illumination light source is mounted and which is accommodated in the console housing, a vehicle interior checking mirror installed at a location closer to the windshield than the illumination board and arranged capable of being in a mirror surface visible position in which a mirror surface is visually recognizable by a passenger, a mirror surface light source that is mounted on the illumination board together with the illumination light source and that is configured to emit light toward the mirror surface of the vehicle interior checking mirror in the mirror surface visible position, and a see-through display plate that is a display plate capable of transparently displaying a symbol indicating predetermined information, wherein the see-through display plate is provided in the console housing at a location between the mirror surface light source and the mirror surface so as not to hinder the passenger from visually recognizing the mirror surface and so as to face a partial region of the mirror surface, and wherein the see-through display plate is configured to allow light from the mirror surface light source to transmit therethrough to display the symbol on the partial region of the mirror surface.

Advantageous Effect of the Invention

According to the overhead console described above, the symbol is displayed in the partial region of the mirror surface of the vehicle interior checking mirror installed at a location closer to the windshield than the illumination board on which the illumination light source is mounted. That is, the symbol is displayed at a location some distance from the illumination light source, thus it is possible to prevent a decrease in the visibility of the symbol due to bright illumination. In addition to that, the mirror surface light source for displaying the symbol on the mirror surface is mounted on the illumination board together with the illumination light source, thus there is no need to separately provide a circuit board for displaying the symbol, allowing to downsize the overhead console.

DETAILED DESCRIPTION OF THE EXEMPLARY EMBODIMENTS

One embodiment of an overhead console of the present invention will be described with reference to the drawings.

Figure 1:
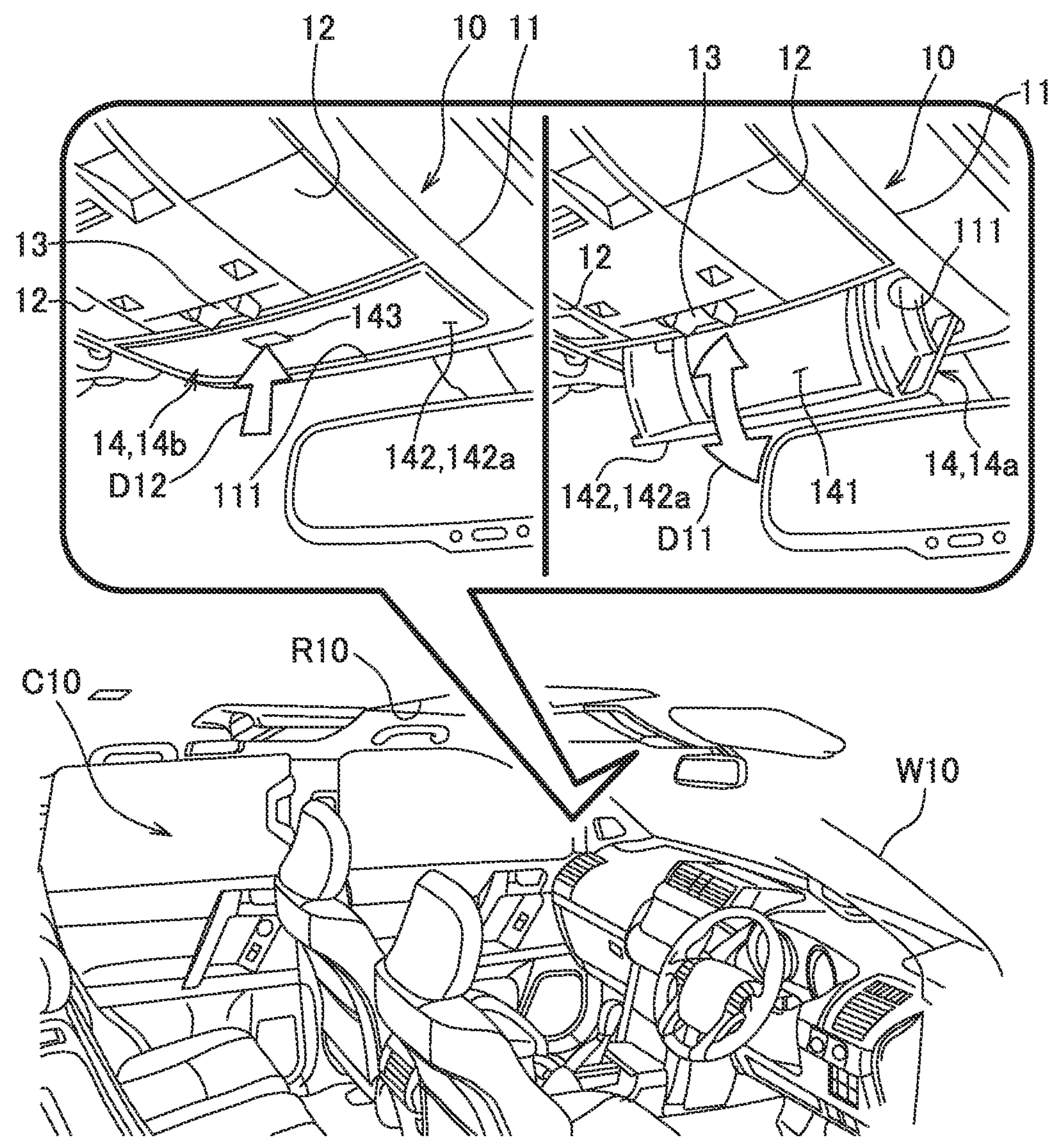
FIG. 1 is an external perspective view of a vehicle interior of a motor vehicle to which an overhead console according to one embodiment is applied.
Figure 2:
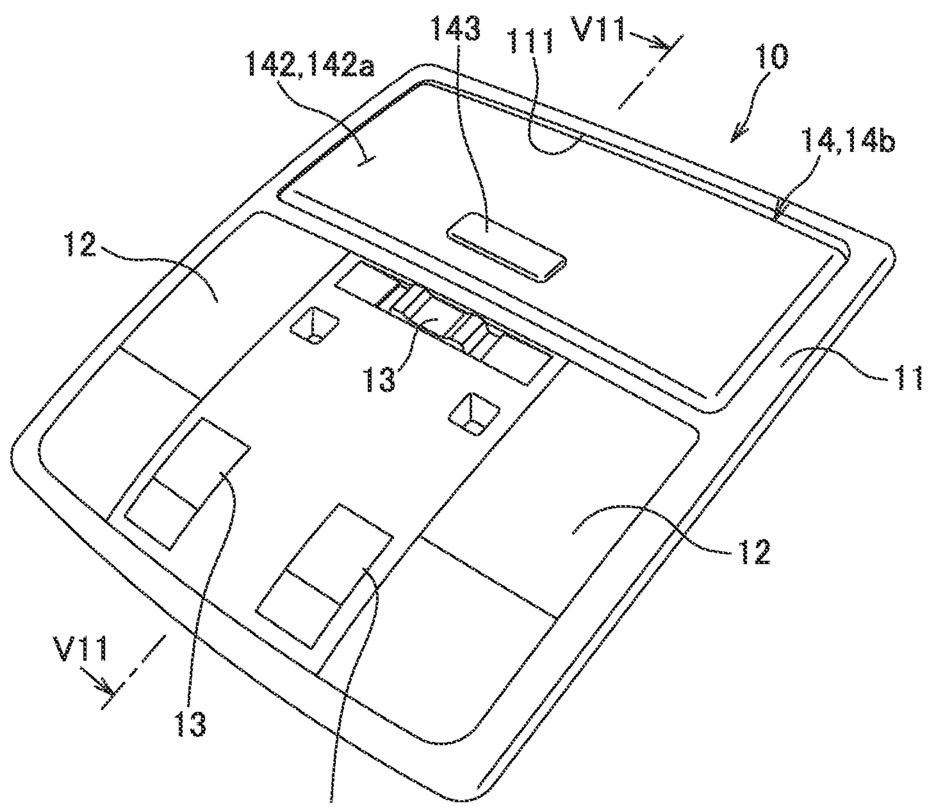
FIG. 2 is an external perspective view of a surface of the overhead console shown in FIG. 1 which can be seen when looking up from a seat.

FIG. 1 is an external perspective view of a vehicle interior of a motor vehicle to which an overhead console according to one embodiment is applied. FIG. 2 is an external perspective view of a surface of the overhead console shown in FIG. 1 which can be seen when looking up from a seat.

An overhead console 10 of this embodiment is a device configured to be attached to a ceiling R10 of a vehicle interior C10 at a location near a windshield W10. The overhead console 10 includes a console housing 11, an illumination 12, a switch 13 for turning on the illumination, and a vehicle interior checking mirror 14. The console housing 11 is a resin housing attached to the ceiling R10 of the vehicle interior C10 near the windshield W10. The illuminations 12 are provided on the right and left sides in a pair, and are configured to illuminate the vehicle interior C10 with light from a later-described illumination light source. A vehicle interior checking mirror 14 is a mirror installed in a manner capable of being in a mirror surface visible position 14*a* in which a mirror surface 141 is visually recognizable by a passenger. In this embodiment, an accommodating space 111 for accommodating the vehicle interior checking mirror 14 is provided inside the console housing 11. The vehicle interior checking mirror 14 is installed to the console housing 11 so as to be movable along an arrow D11 between the mirror surface visible position 14*a* and an accommodated position 14*b* in which the vehicle interior checking mirror 14 is accommodated in the accommodating space 111. The vehicle interior checking mirror 14 is provided with a movement switch 143 for moving the vehicle interior checking mirror 14 to the mirror surface visible position 14*a*, the movement switch 143 being disposed on a bottom face 142*a* of a mirror housing 142 which is flush with a surface of the console housing 11 in the accommodated position 14*b*. When the movement switch 143 is pressed as shown by an arrow D12 in FIG. 1, the vehicle interior checking mirror 14 is moved from the accommodated position 14*b* to the mirror surface visible position 14*a*.

In this embodiment, the vehicle interior checking mirror 14 in the mirror surface visible position 14*a* is used not only for checking the vehicle interior, but also for providing a seatbelt warning to a passenger in the rear seat, the seatbelt warning being a warning related to fastening of a seatbelt.

Figure 3:
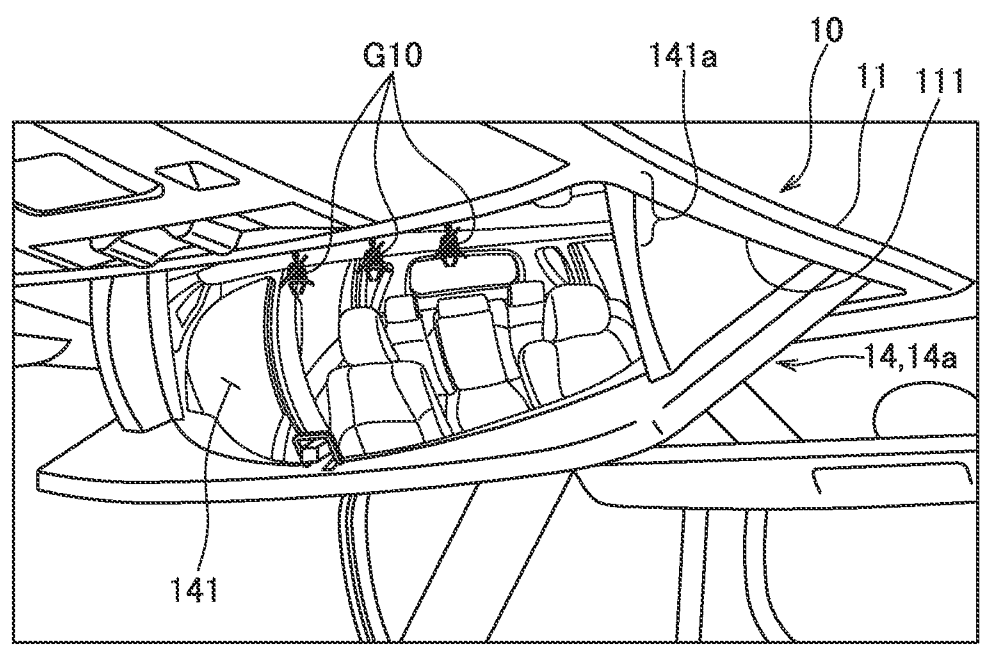
FIG. 3 is a schematic diagram showing how a vehicle interior checking mirror shown in FIG. 1 which is in a mirror surface visible position is used to provide a seatbelt warning to a passenger in a rear seat.

FIG. 3 is a schematic diagram showing how the vehicle interior checking mirror shown in FIG. 1 which is in the mirror surface visible position is used to provide the seatbelt warning to a passenger in the rear seat.

First, in the overhead console 10 of this embodiment, the mirror surface 141 of the vehicle interior checking mirror 14 has a curved surface such that it is visible to all passengers including a passenger in the rear seat, a passenger in a front passenger's seat and a driver. In the case where there is a passenger in the rear seat who is not fastening the seatbelt, a symbol G10 indicating predetermined warning information to warn and urge this passenger to fasten the seatbelt is displayed. This symbol G10 is displayed in a partial region 141*a* of the vehicle interior checking mirror surface 141 in the mirror surface visible position 14*a*, the partial region 141*a* being arranged along an end of the vehicle interior checking mirror surface 141 near the accommodating space 111 of the console housing 11. The symbols G10 are provided so as to form pairs with the three rear seats, respectively, and the symbol G10 that corresponds to the rear seat in which a passenger who is not fastening the seatbelt is seated is to be displayed in the partial region 141*a* of the mirror surface 141. FIG. 3 shows an example in which passengers in all of the three rear seats are not fastening their seatbelts, thus all of the three symbols G10 are being displayed.

The overhead console 10 of this embodiment is configured as explained below to display the warning symbol G10 described above.

Figure 4:
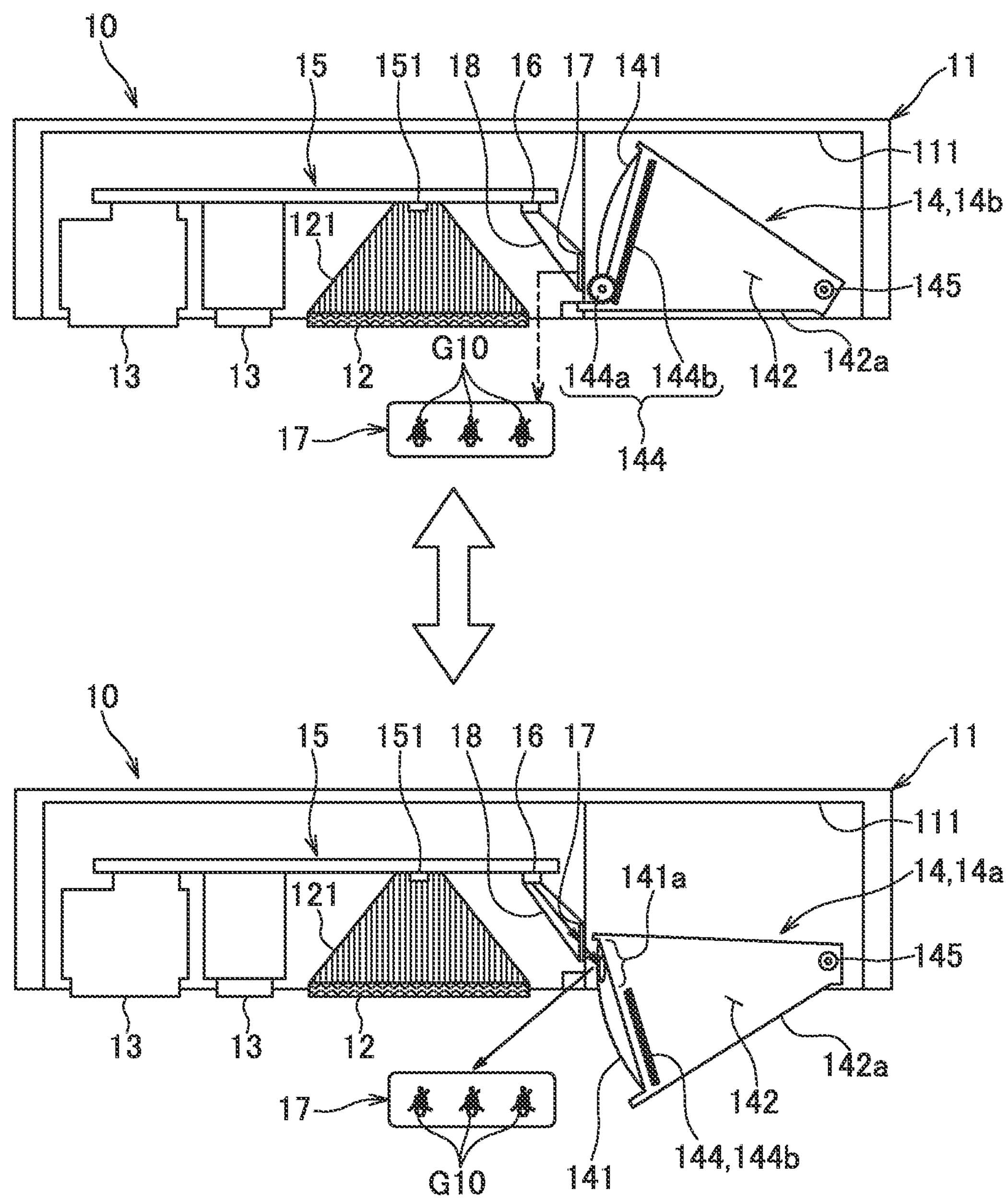
FIG. 4 is a cross sectional view taken along a line V11-V11 in FIG. 2 showing an internal structure of the overhead console of FIG. 1 to FIG. 3.

FIG. 4 is a cross sectional view taken along a line V11-V11 in FIG. 2 showing an internal structure of the overhead console of FIG. 1 to FIG. 3. In FIG. 4, the internal structure of the overhead console 10 is shown in cross section for two cases, namely, the case where the vehicle interior checking mirror 14 is in the accommodated position 14*b*, and the case where the vehicle interior checking mirror 14 is in the mirror surface visible position 14*a*.

The overhead console 10 of this embodiment includes the console housing 11, the illumination 12, the switch 13, the vehicle interior checking mirror 14, the illumination board 15, a mirror surface light source 16, a see-through display plate 17, and a blocking wall 18.

As described above, the console housing 11 is attached to the ceiling R10 of the vehicle interior C10 near the windshield W10. The console housing 11 is formed in a flat rectangular box shape, and the accommodating space 111 for accommodating the vehicle interior checking mirror 14 is provided inside the console housing 11 at a location closer to the windshield W10 than the illumination board 15.

The illumination 12 is configured to illuminate the vehicle interior C10 with light from an illumination light source 151, and has a light guide part 121 for guiding the light from the illumination light source 151 while diffusing said light.

The switch 13 is configured to be operated to, for example, turn on and off the illumination 12 and to activate and deactivate the display function for displaying the above-described symbol G10 to provide the seatbelt warning.

The vehicle interior checking mirror 14 is installed at a location closer to the windshield W10 than the illumination board 15 and is arranged capable of being in the mirror surface visible position 14*a* in which the mirror surface 141 is visually recognizable by a passenger. In this embodiment, the vehicle interior checking mirror 14 is installed in the console housing 11 so as to be movable between the mirror surface visible position 14*a* and the accommodated position 14*b* in which the vehicle interior checking mirror 14 is accommodated in the accommodating space 111. In order to enable such movement, the vehicle interior checking mirror 14 has a mirror housing 142 having a fan-shaped cross section and is installed in the console housing 11 so as to be rotatable around a rotation shaft 145 that penetrates a pivot point of the fan. The mirror surface 141 is formed at an arc portion of the fan, and, by rotating the vehicle interior checking mirror 14 around the rotation shaft 145, the mirror surface 141 protrudes from the accommodating space 111 and is retracted in the accommodating space 111 such that a bottom face 142*a* of the mirror housing 142 is flush with the surface of the console housing 11. This movement of the vehicle interior checking mirror 14 is performed by a drive mechanism 144 having a pinion gear 144*a* and a rack gear 144*b* provided on the mirror surface 141 side.

The illumination board 15 is a flat-plate shaped circuit board on which the illumination light source 151 and the switch 13 are mounted and which is accommodated in the console housing 11. Inside the console housing 11, the illumination board 15 is arranged along the ceiling R10 of the vehicle interior C10.

The mirror surface light source 16 is a light source which is mounted on the illumination board 15 together with the illumination light source 151 and the switch 13, and which is configured to emit light toward the mirror surface 141 of the vehicle interior checking mirror 14 in the mirror surface visible position 14*a* to display the above-described warning symbol G10.

Figure 5:
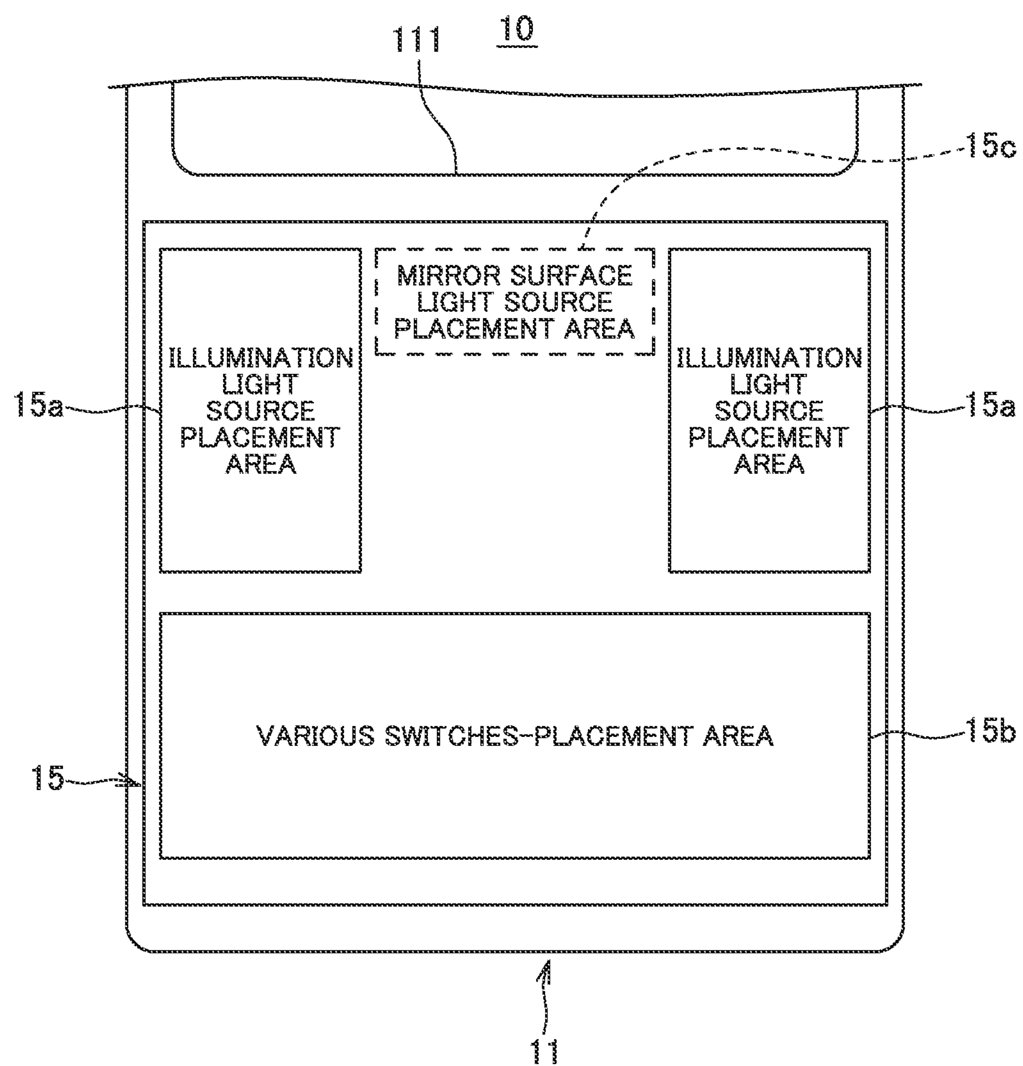
FIG. 5 is a schematic component placement diagram showing an arrangement of a light source and a switch on an illumination board shown in FIG. 4.
Figure 6:
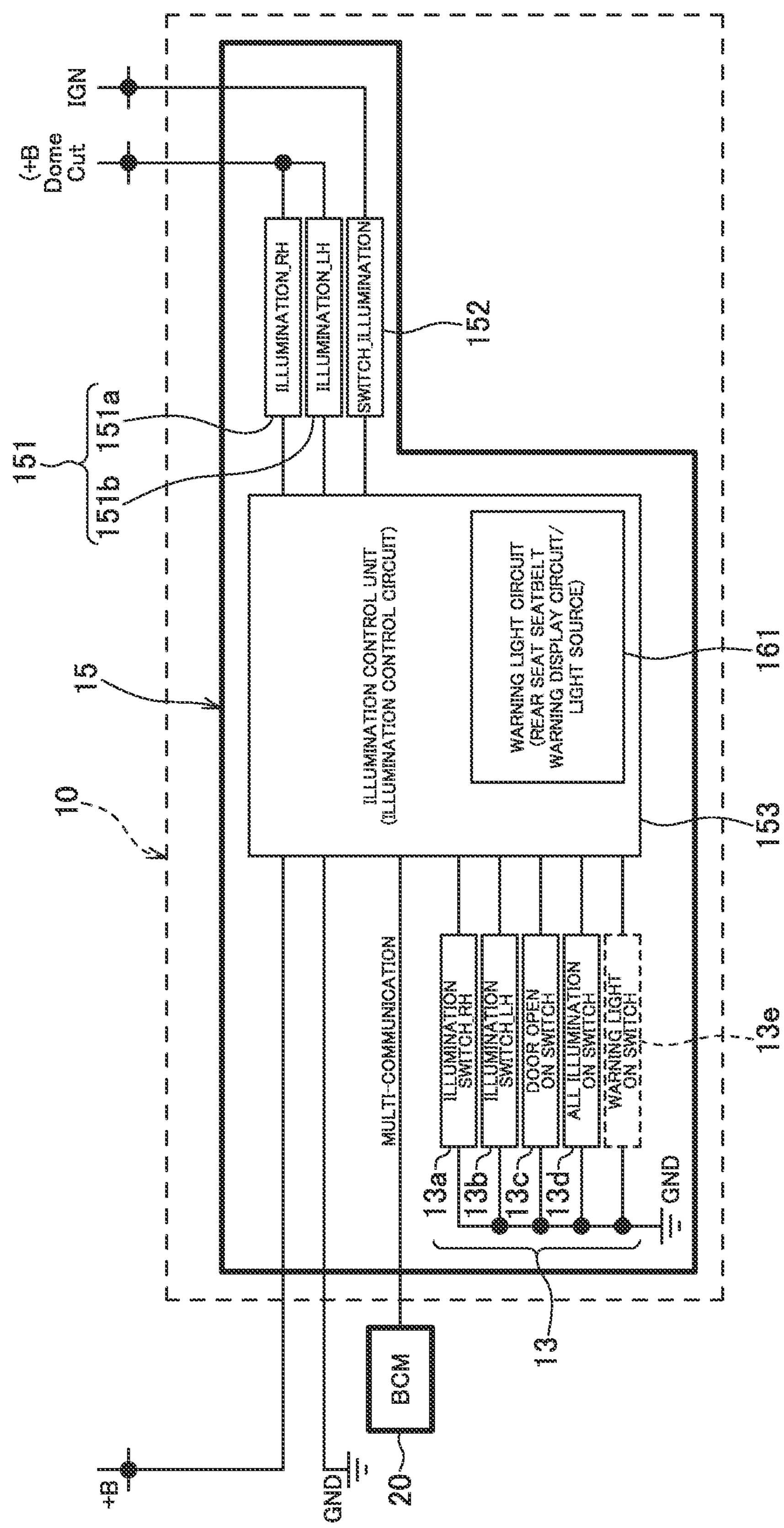
FIG. 6 is a schematic block diagram schematically showing a circuit structure of the illumination board shown in FIG. 4.

FIG. 5 is a schematic component placement diagram showing an arrangement of the light source and the switch on the illumination board shown in FIG. 4. FIG. 6 is a schematic block diagram schematically showing the circuit structure of the illumination board shown in FIG. 4

On the illumination board 15, areas for placing various components are provided on a surface thereof on the side of a floor of the vehicle interior C10 opposite to the ceiling R10. Specifically, as shown in FIG. 5, a various switches-placement area 15*b* is provided to an area of the console housing 11 of the overhead console 10 located on the opposite side of the accommodating space 111 for the vehicle interior checking mirror 14. As shown in FIG. 6, the various switches-placement area 15*b* is mounted with a switch 13*a* for a right illumination light source 151*a* of the illumination light source 151 and a switch 13*b* for a left illumination light source 151*b* of the illumination light source 151. Further, the various switches-placement area 15*b* is mounted with a switch 13*c* for permitting opening and closing of a door, a switch 13*d* for turning on at once all the illumination lamps in the vehicle interior C10, and a switch 13*e* for activating the display function of the warning symbol G10.

Further, on the illumination board 15, a pair of right and left illumination light source placement areas 15*a* is provided on the accommodating space 111 side with a gap between each other, the illumination light source placement areas 15*a* being arranged for placing the pair of right and left illumination light sources 151. Further, a light source for illuminating switch 152 that illuminates each switch when an ignition key is turned is also placed within the pair of illumination light source placement areas 15*a*. A mirror surface light source placement area 15*c* for placing the mirror surface light source 16 is provided between each of the pair of illumination light source placement areas 15*a*. In an area on the accommodating space 111 side including these three areas, there is provided an illumination control circuit 153 configured to control turn on and off of the illumination light source 151 and of the mirror surface light source 16. A part of the illumination control circuit 153 is a warning light circuit 161 configured to control turn on and off of the mirror surface light source 16 to display the warning symbol G10. The illumination control circuit 153 is connected to a BCM (Body Control Module) 20 which is a module installed outside the overhead console 10 for integrating functions of various lights and a door lock function and such.

The illumination board 15 on which the illumination light source 151 and the mirror surface light source 16 are mounted has been explained above, and now, referring back to FIG. 4, other components of the overhead console 10 will be explained below.

The see-through display plate 17 in the overhead console 10 is located in the console housing 11 between the mirror surface light source 16 and the mirror surface 141 so as not to hinder a passenger from visually recognizing the mirror surface 141 and so as to face the partial region 141*a* of the mirror surface 141. This see-through display plate 17 is a display plate capable of transparently displaying the above-described symbol G10 indicating the seatbelt warning information. That is, the see-through display plate 17 allows the light from the mirror surface light source 16 to transmit therethrough to display the symbol G10 in the partial region 141*a* of the mirror surface 141.

The partial region 141*a* of the mirror surface 141 is a region of the mirror surface 141 of the vehicle interior checking mirror 14 along an end of the mirror surface 141 near the accommodating space 111, with the vehicle interior checking mirror 14 in the mirror surface visible position 14*a* and projecting out from the accommodating space 111. The see-through display plate 17 is provided at one wall of walls defining the accommodating space 111 and is located close to an entrance for the vehicle interior checking mirror 14, the one wall corresponding to a facing wall facing the partial region 141*a* of the mirror surface 141 of the vehicle interior checking mirror 14 in the mirror surface visible position 14*a*.

On the see-through display plate 17, transparent display (i.e., see-through display) of the symbol G10 is performed as follows.

Figure 7:
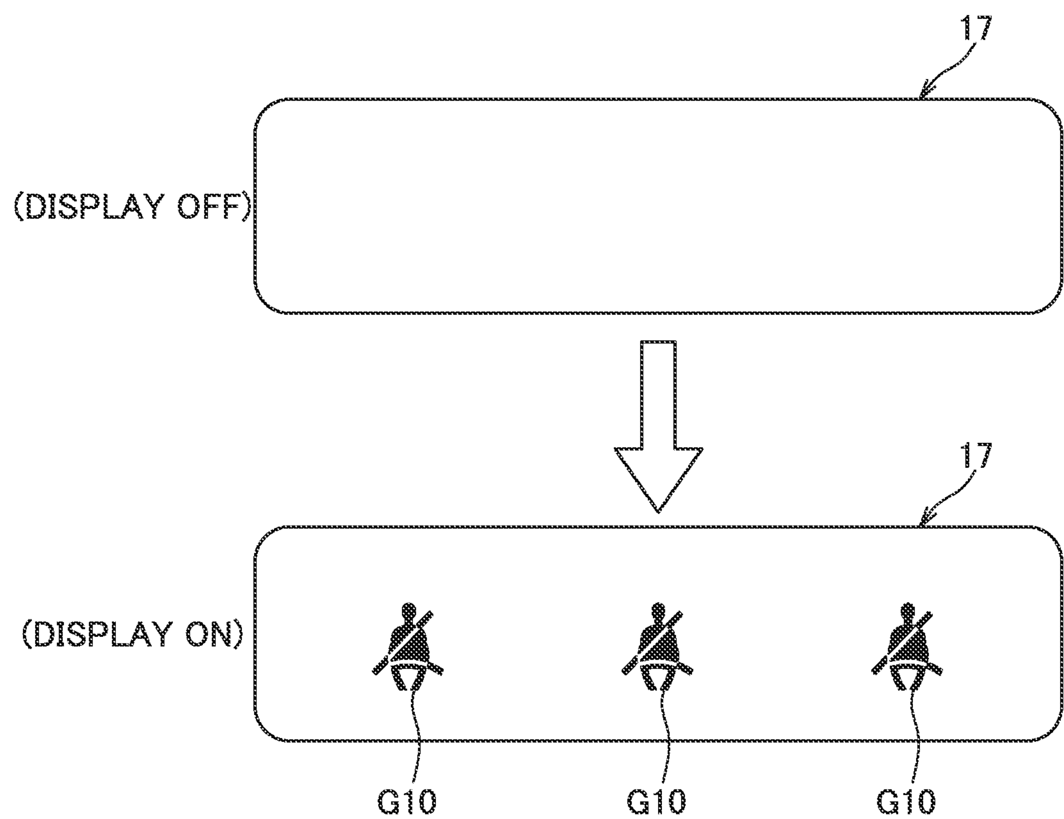
FIG. 7 is a schematic diagram showing how transparent display of a symbol is performed on a see-through display plate shown in FIG. 4.

FIG. 7 is a schematic diagram showing how the transparent display of the symbol is performed on the see-through display plate shown in FIG. 4.

The see-through display plate 17 is capable of being switched between a display state in which the symbol G10 is transparently displayed, and a blackout state in which the see-through display plate 17 is turned black. This switching of the states is performed by a passenger by operating the switch 13*e* shown in FIG. 6 that is configured to activate the display function of displaying the warning symbol G10. When the switch 13*e* is turned on, the symbol G10 is transparently displayed on the see-through display plate 17 according to the seatbelt fastening state, and the mirror surface light source 16 is turned on. The light of the mirror surface light source 16 is transmitted through the see-through display plate 17, and the symbol according to the seatbelt fastening state that is being transparently displayed on the see-through display plate 17 is projected and displayed on the partial region 141*a* of the mirror surface 141. The image projected onto the partial region 141*a* of the mirror surface 141 is reflected by the mirror surface 141 and is directed toward a passenger's eye point, thereby the symbol G10 is visually recognized by the passenger. If there is no passenger who is not fastening the seatbelt, then no symbol G10 is transparently displayed even when the see-through display plate 17 is not in the blackout state. In this case, the partial region 141*a* of the mirror surface 141 is just irradiated with the light of the mirror surface light source 16, and the symbol G10 is not visually recognized by the passenger.

On the other hand, when the switch 13*e* for the display function of displaying the symbol G10 is turned off, then the see-through display plate 17 is in the blackout state. At this time, the blackened see-through display plate 17 is reflected on the partial region 141*a* of the mirror surface 141 together with other inner wall faces defining the accommodating space 111. In this embodiment, the accommodating space 111 is defined by inner wall faces whose color is black. Thus, the blackened see-through display plate 17 and the black colored inner wall faces are reflected on the partial region 141*a* of the mirror surface 141 forming a black band shape.

Further, the overhead console 10 of this embodiment is provided with a blocking wall 18 as shown in FIG. 4. The blocking wall 18 is provided between the mirror surface light source 16 and the see-through display plate 17, and is a part that blocks stray light traveling from the mirror surface light source 16 to directions other than a direction toward the see-through display plate 17.

The overhead console 10 described above can provide advantageous effects as described below. However, before describing them, a comparative example for comparison with this overhead console 10 will be described.

Figure 8:
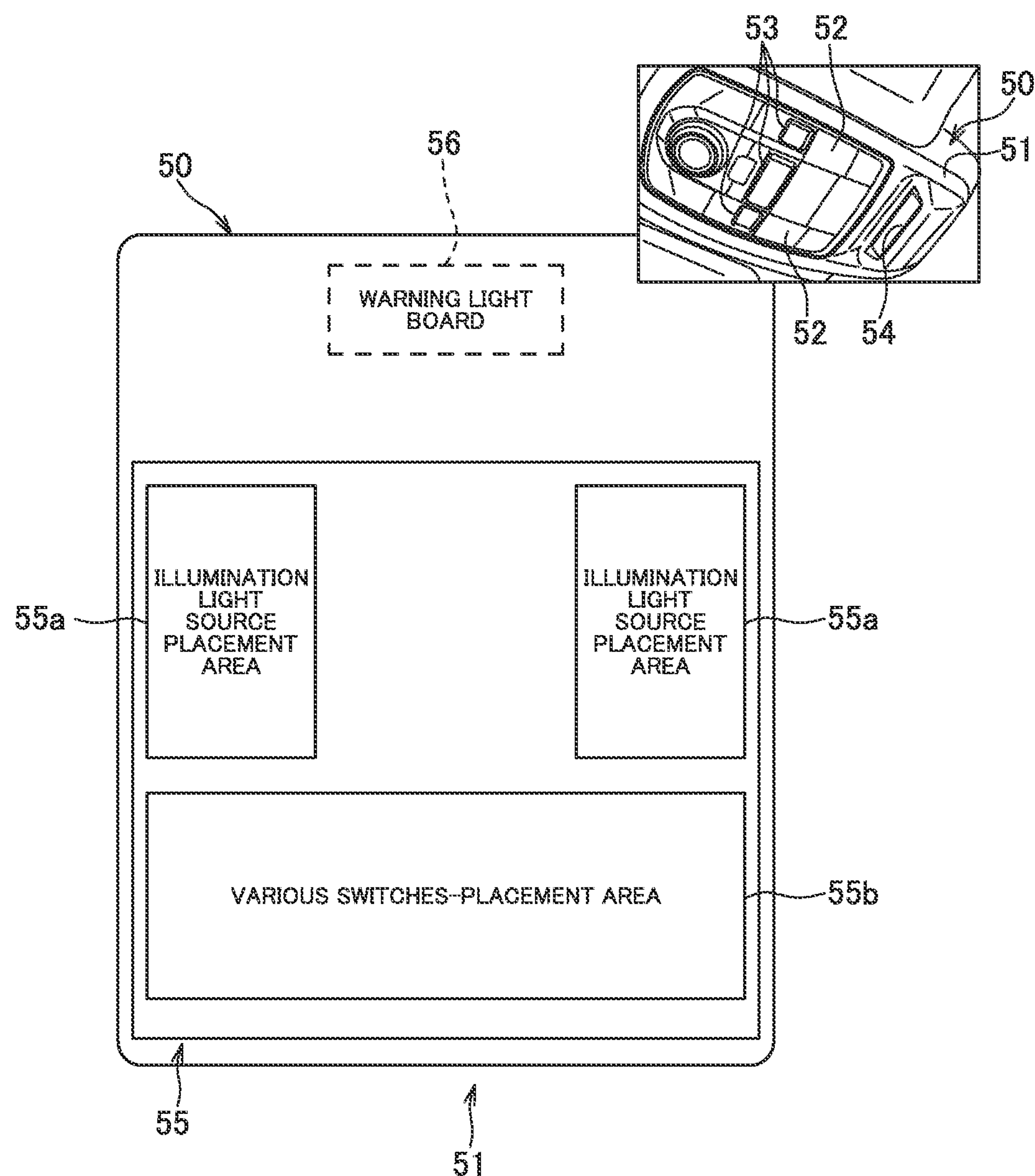
FIG. 8 is a schematic diagram showing a comparative example for comparison with the overhead console shown in FIG. 1 to FIG. 7.

FIG. 8 is a schematic diagram showing a comparative example for comparison with the overhead console shown in FIG. 1 to FIG. 7

An overhead console 50 of the comparative example shown in FIG. 8 does not include a configuration corresponding to the vehicle interior checking mirror 14 of the overhead console 10 of the above-described embodiment. Thus, the overhead console 50 of the comparative example does not have a structure for projecting and displaying the above-described symbol G10 indicating the seatbelt warning information on the mirror surface, and instead of this, it is provided with a dedicated display screen 54 for displaying the symbol G10. The display screen 54 is installed in a console housing 51 at a location some distance from an illumination 52 that illuminates the vehicle interior to avoid the symbol G10 from being difficult to see due to the bright illumination 52. Thus, in the overhead console 50 of the comparative example, a circuit for displaying the symbol G10 on the display screen 54 needs to be located away from an illumination board 55 including an illumination light source placement area 55*a* and a various switches-placement area 55*b*. For this reason, in the overhead console 50 of the comparative example, a warning light board 56 on which the circuit for displaying the symbol G10 is formed is provided as a separate board from the illumination board 55 and is located away from the illumination board 55. Thus, since it is necessary to provide the warning light board 56 separately from the illumination board 55, it is difficult to downsize the overhead console 50 of the comparative example.

In contrast to this comparative example, the overhead console 10 of the embodiment shown in FIG. 1 to FIG. 7 can provide the following advantageous effects. First, according to the overhead console 10, the symbol G10 is displayed in the partial region 141*a* of the mirror surface 141 of the vehicle interior checking mirror 14 that is installed at a location closer to the windshield W10 than the illumination board 15 on which the illumination light source 151 is mounted. That is, since the symbol G10 is displayed at a location some distance from the illumination light source 151, it is possible to prevent a decrease in visibility of the symbol G10 due to the bright illumination. In addition to that, since the mirror surface light source 16 for displaying the symbol G10 on the mirror surface 141 is mounted on the illumination board 15 together with the illumination light source 151, it is not necessary to separately provide a circuit board for displaying the symbol G10, allowing to downsize the overhead console 10.

Further, the overhead console 10 described above utilizes components that are originally provided in a general overhead console, such as the illumination board 15 on which the illumination light source 151 is mounted. That is, according to the above configuration, it is possible to construct the overhead console 10 having the display function without significantly changing the basic structure of a general overhead console as mentioned above.

In this embodiment, the vehicle interior checking mirror 14 that is used as a display unit for the symbol G10 is installed in the console housing 11 so as to be movable between the mirror surface visible position 14*a* and the accommodated position 14*b*, thus the overhead console 10 can be further downsized.

Moreover, in this embodiment, the partial region 141*a* as a region for displaying the symbol G10 is a region of the mirror surface 141 of the vehicle interior checking mirror 14 in the mirror surface visible position 14*a*, the region being arranged along the end of the mirror surface 141 near the accommodating space 111. Further, the see-through display plate 17 is provided at one wall of the walls defining the accommodating space 111 and is located close to the entrance for the vehicle interior checking mirror 14, the one wall corresponding to the facing wall facing the partial region 141*a*. According to this configuration, since the wall defining the accommodating space 111 for the vehicle interior checking mirror 14 is used as a region for installing the see-through display plate 17, it is not necessary to separately provide a region for installing the see-through display plate 17, and in this respect also, the overhead console 10 can be further downsized.

Further, in this embodiment, the see-through display plate 17 is capable of being switched between the display state in which the symbol G10 is transparently displayed and the blackout state in which the see-through display plate 17 is turned black, and the accommodating space 111 is defined by the inner wall faces whose color is back. According to this configuration, when the symbol G10 is not being displayed, the see-through display plate 17 in the blackout state and the inner wall face around it are reflected on the mirror surface 141 of the vehicle interior checking mirror 14, but a boundary line and such between them is desirably less visible since both of them are black.

Further, in this embodiment, the blocking wall 18 for blocking stray light is provided between the mirror surface light source 16 and the see-through display plate 17. According to this configuration, the blocking wall 18 can prevent the leakage of the stray light from the overhead console 10 when the symbol G10 is being displayed.

Further, in this embodiment, the illumination board 15 includes the mirror surface light source placement area 15*c* arranged adjacent to the illumination light source placement area 15*a*. According to this configuration, the mirror surface light source 16 and the illumination light source 151 are arranged in an efficient manner on the illumination board 15, thus the illumination board 15 can be downsized and this can downsize the overhead console 10.

It should be noted that the embodiment described above is only a representative embodiment of the overhead console, and the overhead console is not limited thereto and can be modified and implemented in various ways.

For example, in the above-described embodiment, the symbol G10 indicating the seatbelt warning information is shown as an example of the symbol to be displayed on the mirror surface 141 of the vehicle interior checking mirror 14. However, the symbol to be displayed on the mirror surface 141 of the vehicle interior checking mirror 14 is not limited to this, and any symbol can be adopted as long as it can be transparently displayed on the see-through display plate 17.

Further, in the above-described embodiment, the vehicle interior checking mirror 14 that is installed in the console housing 11 so as to be movable between the mirror surface visible position 14*a* and the accommodated position 14*b* is shown as an example of the vehicle interior checking mirror. However, the vehicle interior checking mirror is not limited to this, and an immovable mirror may be provided integrally with the console housing as long as it is provided to a location capable of reflecting therein the symbol that has been transparently displayed on the see-through display plate. Alternatively, the vehicle interior checking mirror may be provided as a separate component at a location away from the console housing. However, by installing the movable vehicle interior checking mirror 14 in the console housing 11, the overhead console 10 can be further downsized, as described above.

Moreover, in the above-described embodiment, as an example of the partial region in which the symbol is displayed, the partial region 141*a* arranged along the end of the mirror surface 141 near the accommodating space 111 is shown. Further, as an example of the installation location of the see-through display plate, it is illustrated that the see-through display plate is located on the facing wall of the walls defining the accommodating space 111 facing the partial region 141*a* and is located close to the entrance for the vehicle interior checking mirror 14. However, the partial region in which the symbol is displayed and the installation location for the see-through display plate are not limited to these and can be configured arbitrarily. However, as described above, the overhead console 10 can be further downsized by adopting the partial region 141*a* in the above-described location and by adopting the installation location for the see-through display plate 17 as described above.

Further, in the above-described embodiment, as an example of the see-through display plate, the see-through display plate 17 capable of being switched between the display state in which the symbol G10 is being displayed and the blackout state is shown. Further, as an example of the accommodating space for the vehicle interior checking mirror, the accommodating space 111 defined by the black inner wall faces is shown. However, the see-through display plate and the accommodating space are not limited to these. The see-through display plate does not need to be in the blackout state as long as the transparent display of the symbol is possible, and the inner wall faces defining the accommodating space may be in colors other than black. However, as described above, with the see-through display plate 17 capable of being switched between the states and with the inner wall faces defining the accommodating space colored in black, the boundary line and such between the see-through display plate 17 reflected on the mirror surface 141 and the inner wall face defining the accommodating space can be less visible when the symbol G10 is not being displayed.

Further, in the above-described embodiment, as an example of the overhead console, the overhead console 10 including the blocking wall 18 provided between the mirror surface light source 16 and the see-through display plate 17 is shown. However, the overhead console is not limited to this and may not include the blocking wall 18 as described above. However, by providing the blocking wall 18, leakage of stray light can be prevented as described above.

Further, in the above-described embodiment, as an example of the illumination board, the illumination board 15 including the mirror surface light source placement area 15*c* arranged adjacent to the illumination light source placement area 15*a* is shown. However, the illumination board is not limited to this, and the mirror surface light source placement area and the illumination light source placement area may be provided separately from each other. However, as described above, the overhead console 10 can be downsized by providing the mirror surface light source placement area 15*c* adjacent to the illumination light source placement area 15*a*.

LIST OF REFERENCE SIGNS

10 overhead console
11 console housing
12 illumination
13, 13*a*, 13*b*, 13*c*, 13*d*, 13*e* switch
14 vehicle interior checking mirror
14*a* mirror surface visible position
14*b* accommodated position
15 illumination board
15*a* illumination light source placement area
15*b* various switches-placement area
15*c* mirror surface light source placement area
16 mirror surface light source
17 see-through display plate
18 blocking wall
20 BCM (Body Control Module)
111 accommodating space
121 light guide part
141 mirror surface
142 mirror housing
142*a* bottom face
143 movement switch
144 drive mechanism
144*a* pinion gear
144*b* rack gear
145 rotation shaft
151, 151*a*, 151*b* illumination light source
152 light source for illuminating switch
153 illumination control circuit
161 warning light circuit
C10 vehicle interior
G10 symbol
R10 ceiling
W10 windshield

What is claimed is:

1. An overhead console comprising:
a console housing attached to a ceiling of a vehicle interior at a location near a windshield;
an illumination board on which an illumination light source is mounted and which is accommodated in the console housing;
a vehicle interior checking mirror installed at a location closer to the windshield than the illumination board and arranged capable of being in a mirror surface visible position in which a mirror surface is visually recognizable by a passenger;
a mirror surface light source that is mounted on the illumination board together with the illumination light source and that is configured to emit light toward the mirror surface of the vehicle interior checking mirror in the mirror surface visible position; and
a see-through display plate that is a display plate capable of transparently displaying a symbol indicating predetermined information,
wherein the see-through display plate is provided in the console housing at a location between the mirror surface light source and the mirror surface so as not to hinder the passenger from visually recognizing the mirror surface and so as to face a partial region of the mirror surface, and
wherein the see-through display plate is configured to allow light from the mirror surface light source to transmit therethrough to display the symbol on the partial region of the mirror surface.

2. The overhead console according to claim 1, wherein an accommodating space for the vehicle interior checking mirror is provided inside the console housing at a location closer to the windshield than the illumination board, and
wherein the vehicle interior checking mirror is installed at the console housing so as to be movable between the mirror surface visible position and an accommodated position in which the vehicle interior checking mirror is accommodated in the accommodating space.

3. The overhead console according to claim 2, wherein the partial region is a region of the mirror surface of the vehicle interior checking mirror in the mirror surface visible position in which the vehicle interior checking mirror projects out from the accommodating space, the partial region being arranged along an end of the mirror surface near the accommodating space, and wherein the see-through display plate is provided at one wall of walls defining the accommodating space and is located close to an entrance for the vehicle interior checking mirror, the one wall corresponding to a facing wall facing the partial region of the mirror surface of the vehicle interior checking mirror that is in the mirror surface visible position.

4. The overhead console according to claim 2, wherein the see-through display plate is capable of being switched between a display state in which the symbol is transparently displayed, and a blackout state in which the see-through display plate is turned black, and wherein the accommodating space is defined by inner wall faces whose color is black.

5. The overhead console according to claim 1, further comprising a blocking wall provided between the mirror surface light source and the see-through display plate, wherein the blocking wall blocks stray light traveling from the mirror surface light source to directions other than a direction toward the see-through display plate.

6. The overhead console according to claim 1, wherein the illumination board is provided with a placement area for the mirror surface light source arranged adjacent to a placement area for the illumination light source.

* * * * *